United States Patent Office 3,716,027
Patented Feb. 13, 1973

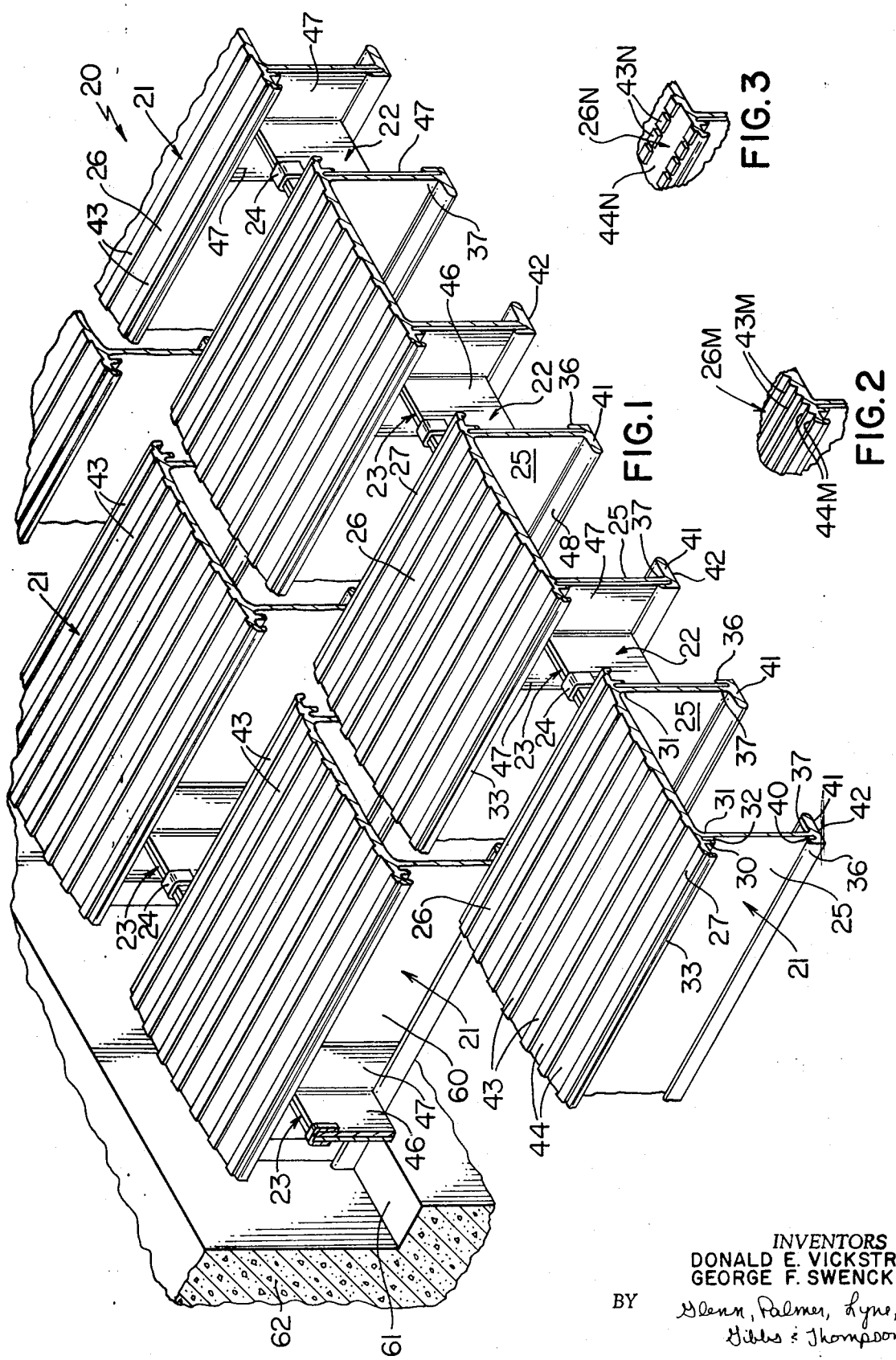

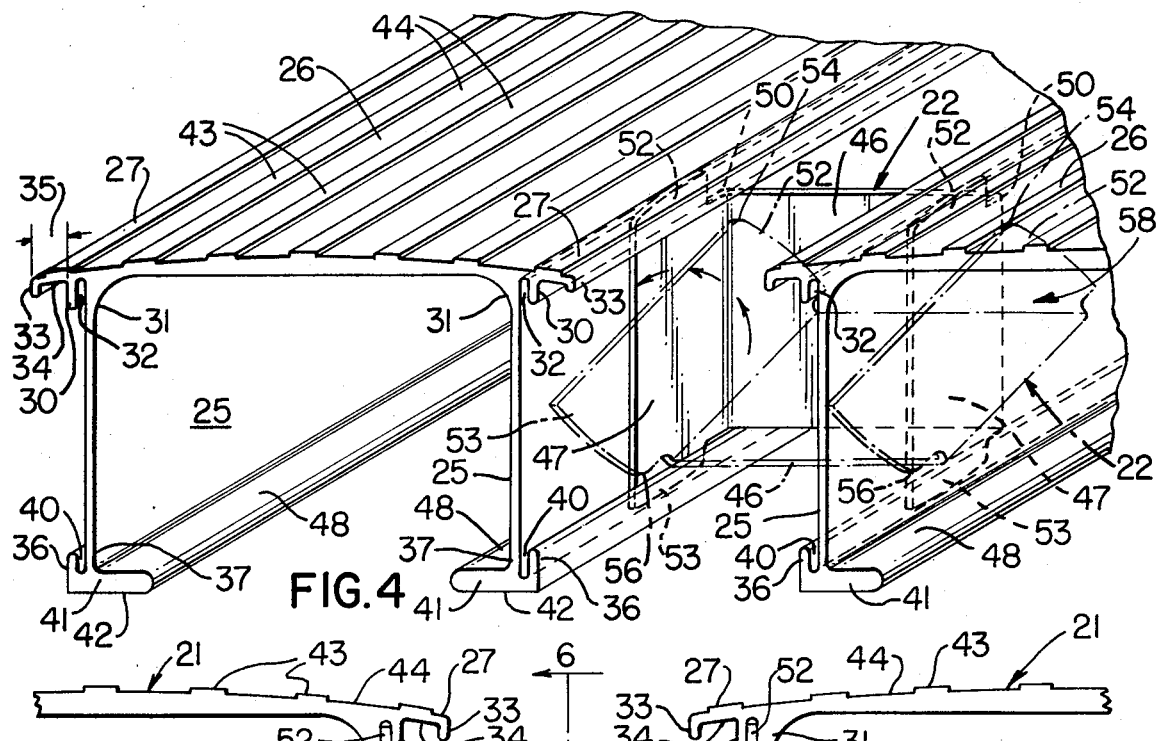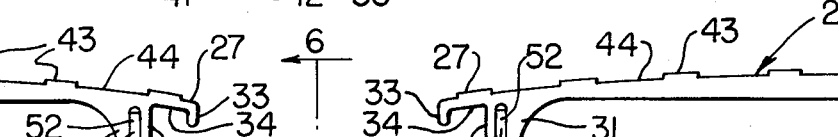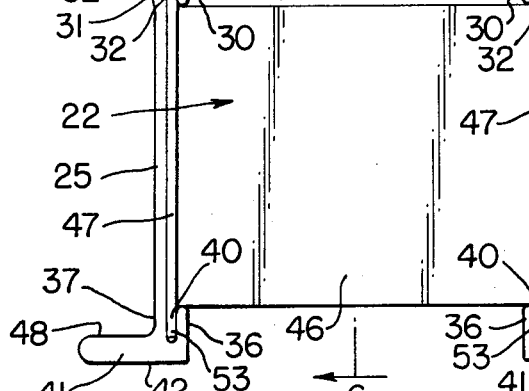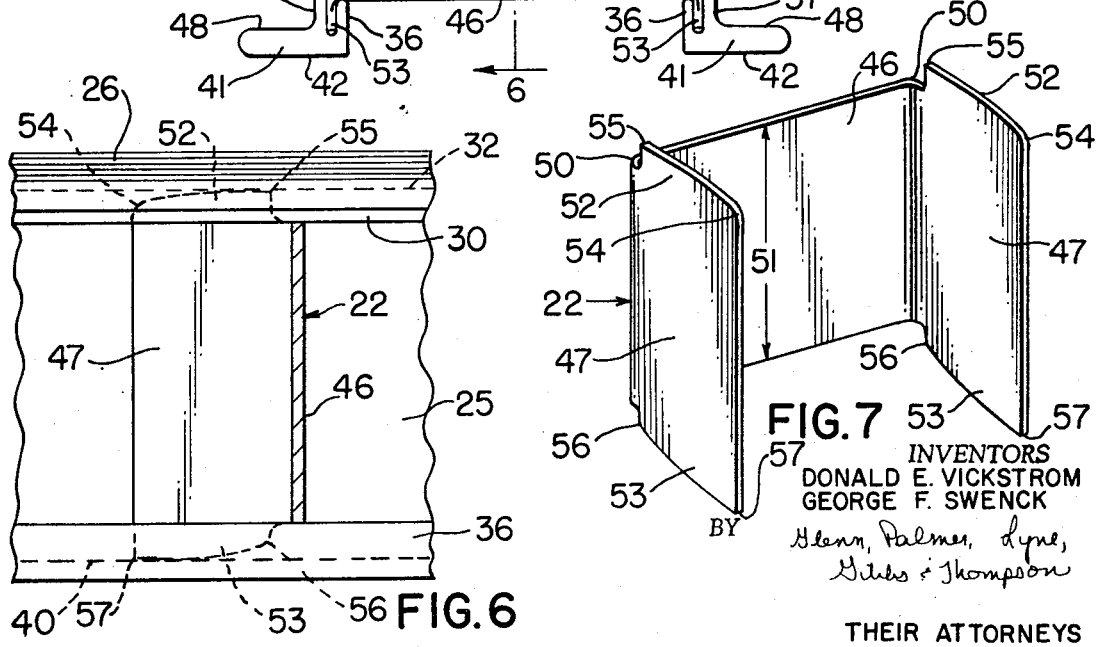

3,716,027
FLOOR CONSTRUCTION AND MEMBER FOR MAKING SAME
Donald E. Vickstrom and George F. Swenck, Richmond, Va., assignors to Reynolds Metals Company, Richmond, Va.
Filed Aug. 13, 1971, Ser. No. 171,527
Int. Cl. A01k 1/00
U.S. Cl. 119—28
20 Claims

ABSTRACT OF THE DISCLOSURE

An improved floor construction is provided which is particularly adapted for an animal enclosure used to raise animals in confinement and such floor construction employs a plurality of improved floor-forming channel members capable of carrying heavy loads as well as improved connector-spacers for holding such channel members together in spaced relation. Each channel member is substantially U-shaped and is comprised of spaced side walls joined together by a top load-carrying wall which has a pair of side portions arranged outwardly of the side walls. A pair of top retaining flanges extend downwardly from the side portions and each retaining flange cooperates with a top portion of an associated side wall to define a top retaining groove therebetween. The channel member may also have a pair of bottom retaining flanges arranged outwardly of the side walls with each bottom retaining flange cooperating with a bottom portion of an associated side wall to define a bottom retaining groove therebetween. Each of the grooves is adapted to receive a portion of a connector-spacer therewithin to connect each channel member in spaced relation to an associated channel member.

BACKGROUND OF THE INVENTION

In providing floor constructions for animal enclosures, used to raise animals in confinement and using comparatively light weight channel members (see U.S. Pat. 3,528,391, for example), it is necessary that such floor constructions be easy to construct and maintain, are economical, provide adequate support for animals while assuring that the animals may move thereon in a satisfactory manner without slippage, and allow materials such as spilled food, animal wastes, etc., to flow easily through each floor construction into an associated receptacle arranged therebeneath to receive such materials.

In applications where relatively large animals such as large swine, cattle, etc., are raised in confinement, it may be desirable to support the channel members employed in spaced relation not only near their bottom portions but also near their top portions yet such channel members should be suitably fastened together employing a minimum amount of structural material for fasteners or connector-spacers.

SUMMARY

This invention provides an improved floor construction particularly adapted for use in raising heavy animals in confinement and utilizes improved high-strength channel members each capable of carrying heavy loads and connector-spacers which provide lateral support substantially along the full vertical height of associated channel members. Each channel member is substantially U-shaped and is comprised of spaced side walls joined together by a top load-carrying wall which has a pair of side portions arranged outwardly of the side walls. A pair of top retaining flanges extend downwardly from the side portions and each retaining flange cooperates with a top portion of an associated side wall to define a top retaining groove therebetween. The channel member may also have a pair of bottom retaining flanges arranged outwardly of the side walls with each bottom retaining flange cooperating with a bottom portion of an associated side wall to define a bottom retaining groove therebetween. Each of the grooves is adapted to receive a portion of a connector-spacer therewithin to connect each channel member in spaced relation to an associated channel member.

Other details, uses, and advantages of this invention will become apparent as the following description of the embodiments thereof presented in the accompanying drawings proceeds.

BRIEF DESCRIPTION OF THE DRAWINGS

FIG. 1 is a perspective view with parts in cross-section and parts broken away illustrating a portion of an embodiment of a floor construction of this invention which utilizes improved substantially U-shaped channel members and connector-spacers, with each channel member utilizing one embodiment of non-skid means on its top load-carrying wall;

FIG. 2 is a fragmentary perspective view illustrating a modification of the channel member of FIG. 1 which employs another embodiment of non-skid means on its top wall;

FIG. 3 is a fragmentary perspective view similar to FIG. 2 illustrating another modification of the channel member of FIG. 1 which employes still another embodiment of non-skid means on its top wall;

FIG. 4 is an enlarged fragmentary perspective view illustrating the manner of installing a typical connector-spacer between a pair of associated channel members;

FIG. 5 is a fragmentary end view of the pair of channel members illustrated in FIG. 4 with the connector-spacer installed in position;

FIG. 6 is a fragmentary view taken on the line 6—6 of FIG. 5; and

FIG. 7 is a perspective view of a typical connector-spacer comprising the floor construction of FIG. 1.

DESCRIPTION OF ILLUSTRATED EMBODIMENTS

Reference is now made to FIG. 1 of the drawings which illustrates one exemplary embodiment of the floor construction of this invention which is designated generally by the reference numeral 20. The floor construction or floor 20 is comprised of a plurality of inverted substantially U-shaped channel members 21 which are suitably fastened together in spaced parallel relation by a plurality of connector-spacers 22 which may be arranged in back-to-back pairs as indicated at 23 and each back-to-back pair is held together by a spring clip 24. Each connector-spacer 22 will be referred to hereinafter simply as connector 22.

The floor construction 20 is particularly adapted for raising heavy animals such as swine, cattle, etc., in confinement. The structural details of each component or member comprising the floor construction 20 will be described subsequently.

As seen particularly in FIGS. 1 and 4, each channel member 21 has a pair of spaced side walls 25 joined together at their top edge portions by a top load-carrying wall 26 and the wall 26 has a pair of side portions 27 arranged outwardly of or overhanging the side walls 25. Each channel member 21 also has a pair of top retaining flanges 30 adjoining and extending downwardly from an associated side portion 27 and each top retaining flange 30 cooperates with a top portion 31 of its associated side wall 25 to define a top retaining groove 32 therebetween. The purpose of the groove 32 will be described in detail subsequently.

Each top retaining flange 30 is arranged inwardly of the terminal side edge 33 of its associated side portion 27 to thereby define an overhanging drip edge 34 outwardly thereof. In this example, the drip edge 34 has a width as indicated at 35.

Each channel member 21 also has a pair of bottom retaining flanges 36 adjoining and arranged outwardly of the side walls 25 and each bottom retaining flange 36 cooperates with a bottom portion 37 of an associated side wall 25 to define an associated bottom retaining groove 40. Although the bottom flanges 36 may extend from and be attached to the bottom portions of side walls 25 in any suitable manner, in this example, such retaining flanges are preferably provided as an integral part of a pair of supporting flanges 41 adjoining the lower edge portions of the side walls 25. Each supporting flange 41 is preferably defined as an integral part of its associated side wall 25.

The supporting flanges 41 are in the form of foot-like flanges and have inwardly directed portions 48 extending inwardly toward the center of the channel member 21 The supporting flanges 41 have bottom surfaces 42 which are arranged substantially coplanar and in a horizontal plane in the floor construction 20 and the surfaces 42 provide a comparatively large bearing surface enabling each channel member 21 to support a comparatively large load on its top load-carrying wall 26. In addition, each retaining flange 36 is arranged outwardly of its associated side wall and is supported on the outer portion of its supporting flange 41 while extending vertically upwardly therefrom and perpendicular to an associated surface 42.

Each channel member 21 also has non-skid means on its top load-carrying wall and such non-skid means in this example comprises a plurality of upwardly extending parallel projections 43 with a groove 44 provided between each immediately adjacent pair of projections 43. The top portions of projections 43 have a substantially rectangular or U-shaped peripheral outline provided with an oppositely arranged pair of sharp corners. The projections 43 and grooves 44 assure movement on the floor construction 20 substantially without skidding.

As previously mentioned, the floor construction 20 is also comprised of a plurality of connector-spacers or connectors 22 and each connector 22 holds an immediately adjacent pair of channel members 21 in spaced relation while preventing horizontal movement thereof. It will also be noted particularly from FIG. 5 of the drawings, that each connector 22 provides lateral support for an associated pair of channel members 21 over a comparatively large vertical distance or height of channel members 21 as indicated at 45. Each connector 22 in essence, provides lateral support over substantially the full vertical height of its associated channel members 21 while firmly holding such channel members together in spaced parallel relation.

As best seen in FIG. 7 of the drawings, each connector-spacer 22 is a substantially U-shaped member having a bight 46 and a pair of legs 47 adjoining opposite edges 50 of the bight and extending substantially perpendicularly thereto. The bight 46 has a vertical height indicated at 51 which is substantially less than the vertical height of the leg portions 47 and each leg portion 47 has top and bottom portions designated by the reference numerals 52 and 53 respectively. Each top portion 52 is particularly adapted to be received within an associated top groove 32 of a channel member 21 and each bottom portion 53 is particularly adapted to be received in an associated bottom groove 40 of a channel member 21.

Each top portion 52 has a forward or front (front or forward in this presentation meaning remote from bight 46) corner 54 which is rounded on a comparatively large arc and a back or rear corner 55 (near bight 46) which may be comparatively sharp.

Each bottom portion 53 has a back or rear corner 56 which is rounded on a comparatively large arc and a forward or front corner 57 which may be comparatively sharp. The purpose of the rounded corners 54 and 56 will be explained in detail subsequently.

The manner in which a pair of adjacent channel members 21 may be installed in position will be readily apparent from FIG. 4 of the drawings wherein it is seen that a connector 22 is positioned with its bight 46 at a slight angle to a horizontal plane and the rounded corners 56 of portions 53 arranged immediately above a pair of associated grooves 40 of an immediately adjacent pair of channel members 21. With the adjacent pair of channel members thus positioned and as shown by dotted lines at 58 in FIG. 4, it will be seen that the top grooves 32 of such channel members are also aligned to receive the top portions 52 of the connector-spacer 22. The connector 22 is then rotated from the dotted line position at 58 to the solid line position illustrated in FIG. 4 and during such rotation the rounded corners 54 and 56 facilitate easy rotation into their associated grooves 32 and 40 respectively. The top portions 52 of the legs 47 of connector-spacer 22 are thus nestably received within associated top retaining grooves 32 and the bottom portions 53 are nestably received within the bottom retaining grooves 40 whereby the associated pair of channel members 21 are fastened together in spaced relation and held firmly against transverse movement along substantially their full vertical height 45 and as previously mentioned.

Ordinarily, a pair of channel members 21 could be supported in spaced relation using a single connector 22 at spaced intervals along the length of such channel members 21; however, in this example, the connectors 22 are preferably employed in pairs or sets of two. Accordingly, a second connector is suitably placed in position and rotated in a similar manner as illustrated in FIG. 4.

The second connector 22 is positioned so that its outwardly extending legs 47 extend in a diametrically opposite direction from the legs 47 of the first connector whereupon the bights 46 of an associated pair of connectors 22 are arranged against each other and in back-to-back relation, as shown at 23 in FIG. 1, whereupon an associated spring clip 24 is used to fasten the back-to-back connectors together. It will be appreciated that a single connector 22 could be dislodged or rotated out of its holding position by an animal inadvertently stepping against the top portion of such connector or an object striking such top portion. The use of back-to-back connectors 22 held together as described above prevents such dislodging.

The tolerances between the portions 52 and 53 of each connector 22 and their associated retaining grooves 32 and 40 respectively are such that each associated pair of connectors 22 may be easily slid horizontally along their grooves 32 and 40. Thus, each pair of connectors 22 may be suitably positioned along their channel members to provide optimum stability for the floor construction 20.

The channel members 21 comprising the floor construction 20 of FIG. 1 have opposite end portions 60 which are supported on a suitable supporting structure comprising the animal enclosure. In this example, each end portion 60 is supported on an associated substantially planar horizontal ledge 61 of a supporting concrete wall 62. The channel members 21 and floor construction 20 are thus supported in position over a suitable conventional pit, tank, or trough-like structure (not shown) which is adapted to receive any material, such as animal wastes, which drop through the floor construction 20 and each pit may be cleaned of any accumulation therein using known techniques.

The non-skid means provided on the top load-carrying wall 26 of each member 21 are in the form of parallel projections 43 which extend the full length of each channel member and each immediately adjacent pair of projections has a rectangular groove 44 arranged therebetween. However, it will be appreciated that the non-skid means may have any suitable cross-sectional configuration and may be provided either as an integral part of top wall 26 or provided as a separate component and attached thereto.

For example, FIG. 2 shows a modification of member 21 which employs non-skid means on its top wall 26M in the form of upwardly extending projections 43M each having a substantially triangular or V-shaped cross-sectional configuration. Each immediately adjacent pair of V-shaped projections 43M is separated by a groove 44M.

FIG. 3 of the drawings illustrates another modification of non-skid means provided on top wall 26N comprised of a plurality of spaced projections 43N arranged in a plurality of longitudinal rows which are parallel to the longitudinal axis of the associated member 21. Each projection 43N is adjoined at both ends and sides by depressions 44N whereby each projection is adjoined by depressions around its entire periphery. Each projection 43N has a planar top surface and a rectangular outline as viewed in a direction perpendicular to top wall 26N; however, each projection 43N may have any suitable outline or top surface.

The channel members 21 and connectors 22 may be made in any suitable manner and using any suitable material; however, such channel members and connectors are preferably made of high strength light weight materials. In addition, the channel members 21 are preferably made by extrusion process of metallic materials containing aluminum.

The side walls 25 comprising each channel member 21 are shown as vertical side walls which are arranged in parallel relation; however, it will be appreciated that such side walls may converge toward each other and in such instance, the configuration of the bight 46 of each connector 22 would have a corresponding trapezoidal configuration with the longer side of its parallel sides being arranged adjacent the bottom of an associated pair of channel members 21.

It will also be appreciated that with side portions 27 outwardly of vertical side walls 25 (regardless of whether the drip edges 34 are provided) a channel or passage is defined between each immediately adjacent pair of channel members 21 which abruptly expands in size, under portions 27, to allow easy flow of waste materials through such passage.

While present exemplary embodiments of this invention, and methods of practicing the same, have been illustrated and described, it will be recognized that this invention may be otherwise variously embodied and practiced within the scope of the following claims.

What is claimed is:

1. A substantially U-shaped channel member for use in a floor construction, said channel member comprising, a pair of spaced side walls, a top load-carrying wall adjoining said side walls and having a pair of side portions overhanging said side walls, a pair of top retaining flanges extending downwardly from said side portions with each top retaining flange cooperating with a top portion of an associated side wall to define a top retaining groove therebetween, and a pair of bottom retaining flanges arranged outwardly of said side walls with each bottom retaining flange cooperating with a bottom portion of an associated side wall to define a bottom retaining groove therebetween, each of said retaining grooves being adapted to receive a portion of a connector-spacer therewithin to connect said channel member in spaced relation to an associated channel member.

2. A channel member as set forth in claim 1 in which each of said top retaining flanges is arranged inwardly of the terminal side edge of its associated side portion to define an overhanging drip edge outwardly of its adjacent top retaining flange.

3. A channel member as set forth in claim 1 and further comprising a pair of inwardly directed supporting flanges each adjoining the lower edge portion of an associated side wall, said supporting flanges having bottom surfaces which are arranged substantially coplanar in a horizonal plane and provide comparatively large bearing surfaces enabling said channel member to support a comparatively large load on its top load-carrying wall.

4. A channel member as set forth in claim 1 and further comprising a pair of inwardly directed supporting flanges adjoining the lower edge portions of said side walls and said supporting flanges having inwardly directed portions extending inwardly toward the center of said channel member with each supporting flange having an associated bottom retaining flange extending upwardly therefrom outwardly of an associated side wall.

5. A channel member as set forth in claim 1 in which said side walls extend vertically and are arranged in parallel relation.

6. A channel member as set forth in claim 5 in which each of said top retaining flanges is arranged inwardly of the terminal edge of its associated side portion to define an overhanging drip edge outwardly of its adjacent top retaining flange.

7. A channel member as set forth in claim 1 and further comprising non-skid means on said top wall.

8. A channel member as set forth in claim 7 in which said non-skid means comprises a plurality of upwardly extending parallel projections provided with a groove between each immediately adjacent pair of projections, each of said projections having a substantially V-shaped cross-sectional outline.

9. A channel member as set forth in claim 7 in which said non-skid means comprises a plurality of spaced projections arranged in a plurality of longitudinal rows parallel to the longitudinal axis of the channel member, each projection being adjoined by depressions around its entire periphery.

10. A floor construction comprising; a plurality of substantially U-shaped channel members with each of said channel members comprising, a pair of spaced side walls, a top load-carrying wall adjoining said side walls and having a pair of side portions overhanging said side walls, a pair of top retaining flanges extending downwardly from said side portions with each top retaining flange cooperating with a top portion of an associated side wall to define a top retaining groove therebetween, and a pair of bottom retaining flanges arranged outwardly of said side walls with each bottom retaining flange cooperating with a bottom portion of an associated side wall to define a bottom retaining groove therebetween; and a plurality of connectors holding said channel members in spaced parallel relation with each connector having portions received within grooves of associated members.

11. A floor construction as set forth in claim 10 in which each connector provides lateral support over substantially the full vertical height of its associated channel members.

12. A floor construction as set forth in claim 11 in which each connector has a substantially U-shaped configuration defined by a bight and a pair of parallel legs adjoining opposite edges of said bight, said bight providing the spacing between an associated pair of connectors and each of said legs having top and bottom portions received within associated top and bottom grooves respectively.

13. A floor construction as set forth in claim 12 in which each of said legs has a roughly rectangular outline and diagonally opposed rounded corners which facilitate easy rotation of each connector from a substantially horizontal position to a vertical position with its top and bottom portions arranged within said associated grooves.

14. A floor construction as set forth in claim 11 in which said connectors are arranged in back-to-back pairs.

15. A floor construction as set forth in claim 14 and further comprising a plurality of spring clips each holding together an associated back-to-back pair of connectors.

16. A floor construction as set forth in claim 11 in which each of said channel members has each of its top retaining flanges arranged inwardly of the terminal side edge of its associated side portion to define an overhanging drip edge outwardly of its adjacent top retaining flange.

17. A floor construction as set forth in claim 11 in which each of said channel members further comprises a pair of inwardly directed supporting flanges each adjoining the lower edge portion of an associated side wall, said supporting flanges having bottom surfaces which are arranged substantially coplanar in a horizontal plane and provide comparatively large bearing surfaces enabling said channel member to support a comparatively large load on its top load-carrying wall.

18. A floor construction as set forth in claim 11 in which the side walls of each channel member extend vertically and are arranged in parallel relation.

19. A floor construction as set forth in claim 18 in which each of the top retaining flanges of each channel member is arranged inwardly of the terminal edge of its associated side portion to define an overhanging drip edge outwardly of its adjacent top retaining flange.

20. A floor construction as set forth in claim 18 wherein said channel members comprise extruded members made of a metallic material.

References Cited

UNITED STATES PATENTS

| | | | |
|---|---|---|---|
| 3,230,931 | 1/1966 | Taylor et al. | 119—28 |
| 3,528,391 | 9/1970 | Johnson | 119—28 |
| 3,555,762 | 1/1971 | Costanzo, Jr. | 52—588 |

HUGH R. CHAMBLEE, Primary Examiner

U.S. Cl. X.R.

52—588, 669